(12) United States Patent
Devries et al.

(10) Patent No.: US 7,539,476 B2
(45) Date of Patent: May 26, 2009

(54) RF-TO-BASEBAND RECEIVER ARCHITECTURE

(75) Inventors: Christopher Andrew Devries, Ottawa (CA); Ralph Dickson Mason, Ottawa (CA); Ronald Douglas Beards, Mountain (CA)

(73) Assignee: Kleer Semiconductor Corporation, Ottawa (CA)

( * ) Notice: Subject to any disclaimer, the term of this patent is extended or adjusted under 35 U.S.C. 154(b) by 463 days.

(21) Appl. No.: 11/374,571

(22) Filed: Mar. 13, 2006

(65) Prior Publication Data

US 2007/0213019 A1 Sep. 13, 2007

(51) Int. Cl.
*H04B 15/00* (2006.01)
*H04Q 7/20* (2006.01)

(52) U.S. Cl. .................. 455/313; 455/265; 331/55; 331/172

(58) Field of Classification Search .................. 455/76, 455/207–209, 259–260, 264–265, 313–314, 455/323; 331/47, 55, 172
See application file for complete search history.

(56) References Cited

U.S. PATENT DOCUMENTS

| | | | |
|---|---|---|---|
| 4,776,040 | A | 10/1988 | Ichikawa et al. |
| 5,640,698 | A | 6/1997 | Shen et al. |
| 6,963,249 | B2 | 11/2005 | Devries et al. |
| 6,983,136 | B2 | 1/2006 | Mason et al. |
| 2002/0181614 | A1 | 12/2002 | Mostafa et al. |
| 2004/0005869 | A1 | 1/2004 | See et al. |

OTHER PUBLICATIONS

Chris DeVries et al., *A 0.18 μm CMOS, High Q-enhanced Bandpass Filter with Direct Digital Tuning*, Proceedings of the IEEE 2002 Custom Integrated Circuits Conference, May 12-15, 2002, pp. 279-282.

Hesham Ahmed et al., *A Digitally Tuned 1.1 GHz Subharmonic Injection-Locked VCO in 0.18 μm CMOS*, Proceedings of the 29th European Solid-State Circuits Conference, Sep. 16-18, 2003, pp. 81-84.

(Continued)

*Primary Examiner*—Lee Nguyen
(74) *Attorney, Agent, or Firm*—Workman Nydegger (57) ABSTRACT

An improved receiver architecture and method for a wireless transceiver (e.g. for a headphone) is provided whereby the receiver, advantageously, enables the use of only one synthesizer circuit for both the RF-to-IF and IF-to-base band conversion processes which, in turn, provides for lower power consumption. The receiver includes an injection locked local receiver oscillator (Rx LO) which is used for the first mixing stage (i.e. the RF-to-IF conversion). The Rx LO 105 is thereby able to use a high-level harmonic of a relatively low reference frequency signal produced by that synthesizer (e.g. a fractional-N phase locked loop circuit (PLL)). The receiver further includes a tunable Q-enhanced IF filter 110 and complex sub-sampling and mixing down-conversion circuitry for the second conversion stage (i.e. IF-to-baseband conversion). The sampling frequency used for the second conversion stage is a harmonic of the reference frequency derived from the synthesizer (PLL). For example, transceiver channels may be designed on the basis that the RF frequency $f_{RF}$ is assigned a value of $(n\pm\frac{1}{4})\cdot f_s$, where the frequency $f_{PLL}$ of the PLL may be chosen to be twice the sub-sampling frequency $f_s$ and the frequency $f_{Rx\,LO}$ of the Rx LO may be nine times the frequency $f_{PLL}$.

19 Claims, 9 Drawing Sheets

OTHER PUBLICATIONS

Ralph Mason, *An RF Sub-Sampling Mixer, PGA and ΣΔADC for Conversion at 900 MHZ*, Proceedings of the 2004 International symposium on Circuits and Systems, vol. 1, May 23-26, 2004, pp. I-477-I-480.

Chris DeVries et al., *A 0.18 μM CMOS 900 MHZ Receiver Front-end Using RF Q-Enhanced Filters*, Proceedings of the 2004 International Symposium on Circuits and Systems, vol. 4, May 23-26, 2004, pp. IV-325-IV-328.

H. Ahmed et al., *RF, Q-enhanced Bandpass Filters in Standard 0.18 μm CMOS with Direct Digital Tuning*, Proceedings of the 2003 International Symposium on Circuits and Systems, May 25-28, 2003, pp. I-577-I-580.

Darius Jakonis et al., *A 2.4-GHz RF Sampling Receiver Front-End in 0.18 μm CMOS*, IEEE Journal of Solid-State Circuits, vol. 40, No. 6, Jun. 2005, pp. 1265-1277.

David H. Shen et al., *A 900-Mhz RF Front-End with Integrated Discrete-Time Filtering*, IEEE Journal of Solid-State Circuits, vol. 31, No. 12, Dec. 1996, pp. 1945-1954.

Ricardo Del Rio; *Digital down conversion stage design for superheterodyne receivers; RF Signal Processing*; Nov. 2000; www.rfdesign.com, pp. 28-32.

Jacques C. Rudell et al.; *A 1.9 Ghz wide-band IF double Conversion CMOS Integrated Receiver for Cordless Telephone Applications*; Solid-State Circuits, Journal of IEEE, vol. 32, Issue 12, Dec. 1997 pp. 2071-2088, Digital Object Identifier 10.1109/4.643665 pp. 1-13.

Min Zou et al., *Quad Demodulators Arm Direct-Conversion Receivers*, ED Online ID #7470; www.mwrf.com, 4 pages, as early as Dec. 2005.

David G. Rahn, *A Fully Integrated Multiband MIMO WLAN Transceiver RFIC*, IEEE Journal of Solid-State Circuits, vol. 40, No. 8, Aug. 2005, pp. 1629-1641.

RF-TO-BASEBAND RECEIVER ARCHITECTURE

FIELD OF INVENTION

The invention relates to the field of wireless communications transceivers and, more specifically, to the receiver analog architecture.

BACKGROUND

The increased popularity of wireless audio products has established a need for wireless headphone solutions but current circuit architectures, such as those using Bluetooth technology, have not been successful largely because their power consumption is too high. In addition, their interference management is poor, leading to unacceptable performance in real-life applications.

The commonly used architecture for radio (wireless) receivers is that which is referred to as the superheterodyne receiver architecture. This type of receiver performs at least one frequency down-conversion of the analog carrier (RF) frequency to an intermediate frequency (IF), using a local synthesizer (i.e. a reference frequency synthesizer/phase locked loop (PLL) circuit) and mixer circuit to obtain the baseband signal. Architectures using both a fixed and non-fixed IF are known but, disadvantageously, known architectures for the former require the use of at least two synthesizer/PLL circuits and those for the latter are not normally suited for using sub-sampling and require a high dynamic range in the IF and second down-conversion, due to channeling and aliasing factors, respectively. These requirements of known architectures increase the overall power requirements of the receiver.

Accordingly, there is a need for an improved receiver architecture which provides narrow band selection capability and low power consumption.

DETAILED DESCRIPTION OF ILLUSTRATED EMBODIMENT

(i) BRIEF DESCRIPTION OF THE DRAWINGS

A better understanding of the invention will be obtained by considering the detailed description below, with reference to the following drawings in which like references refer to like elements throughout.

(ii) DESCRIPTION

Aspects of the claimed receiver architecture provide radio frequency (RF) receiver circuitry, and a method, for down-converting an RF signal to base band. RF-to-IF conversion circuitry, configured for RF-to-IF conversion of the RF signal to an IF signal, comprises mixer circuitry for down-converting the RF signal to a band pass IF signal. Local oscillator circuitry is configured for injection locking and generating an RF-to-IF mixing signal for input to the mixer circuitry, the mixing signal having a frequency which is a first pre-selected harmonic (e.g. 9) of a reference frequency. Tunable IF filter circuitry is configured for pre-tuning (e.g. a center frequency parameter and/or a Q parameter of) the IF filter to the band of the band pass IF signal and, when so tuned, for filtering the band pass IF signal. IF-to-base band conversion circuitry, configured for IF-to-base band conversion of the IF signal, comprises sub-sampling and down-conversion circuitry operating at a sampling frequency of a sampling signal input thereto, the sampling frequency being a second pre-selected harmonic (e.g. 2) of the reference frequency. Reference frequency source circuitry (e.g. a synthesizer) is configured for generating a reference signal of the reference frequency, wherein the mixing signal and the sampling signal are derived from the reference signal as a harmonic thereof.

Selectably operable injection locking pre-tuning circuitry is configured for pre-tuning the local oscillator circuitry to an injection locking frequency sufficiently within a locking bandwidth of the local oscillator circuitry to enable injection locking by the first pre-selected harmonic of the reference signal. The injection locking pre-tuning circuitry operates the sub-sampling down-conversion circuitry at selectable sampling frequencies determined by digital baseband circuitry for down-converting the RF signal wherein the selectable sampling frequencies are selected for producing those alias bands from which the injection locking frequency is distinguished on the basis of a measure of energy of the down-converted RF signal. An energy detect component is configured for determining that measure of energy. The sub-sampling and down-conversion circuitry preferably comprises I and Q complex signal component sub-samplers and the receiver circuitry may also include analog to digital circuitry and digital baseband circuitry comprising a microcontroller which selects said reference frequency. The tunable IF filter circuitry preferably includes a noise generator configured for generating, and selectably inputting to the tunable IF filter circuitry, a white noise signal for use in tuning the tunable IF filter circuitry.

Figure 1:
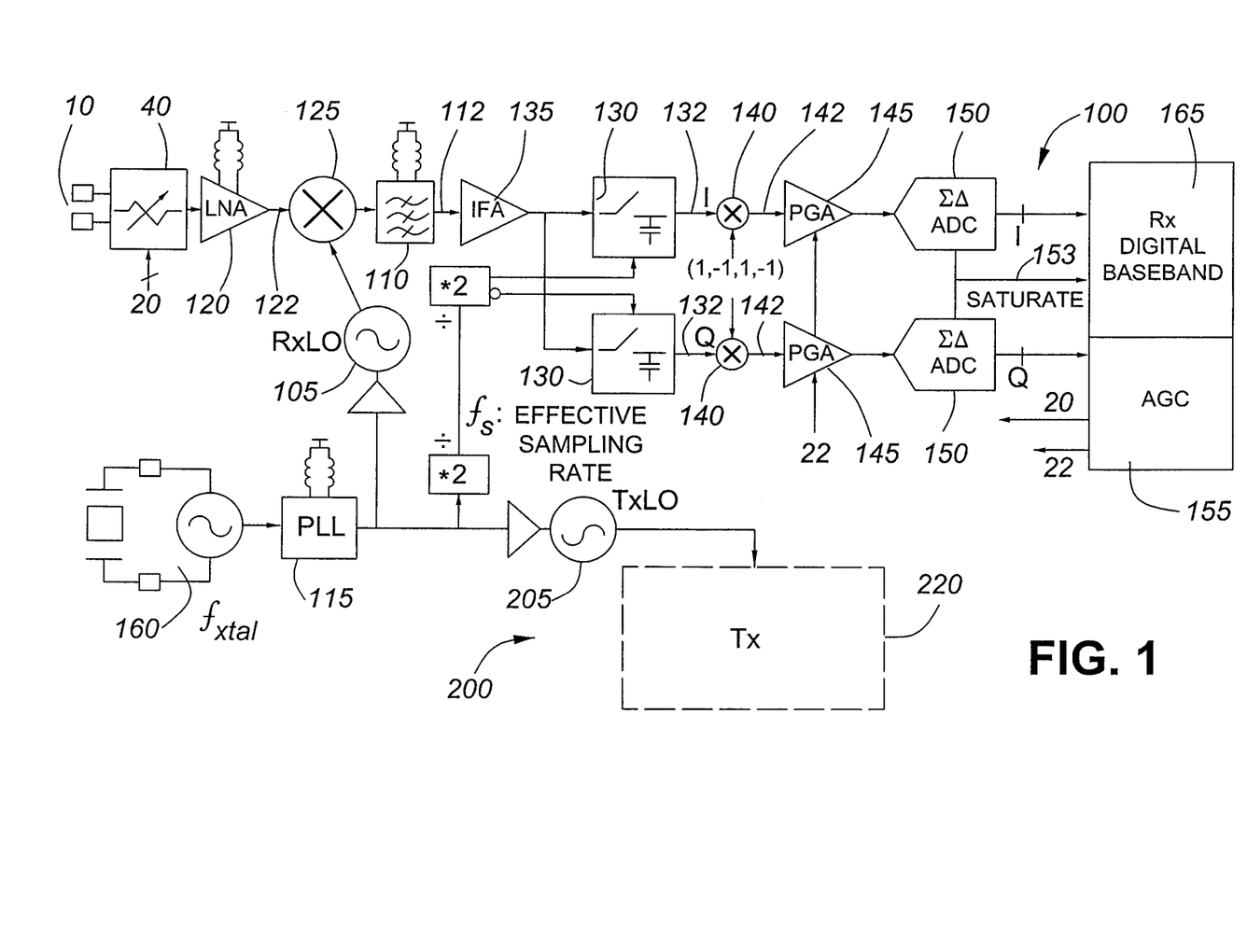
FIG. 1 is a schematic block diagram of exemplary receiver circuitry in accordance with an embodiment of the invention, and also shows complementary transmitter local oscillator (Tx LO) circuitry for illustration purposes.

FIG. 1 illustrates an embodiment of the receiver architecture 100 (and for illustrative purposes only also shows, in dotted outline, a possible transmitter circuitry 220 for advantageously using a complementary transmitter architecture having a local transmitter oscillator (Tx LO) 205 which is also injection locked using a harmonic of the reference oscillator 115). An example of a product application of this architecture incorporates the receiver transmitter circuitry into portable electronics for which power consumption is a key advantage and which may use multiple channels spread through the 2.4 GHz industrial, scientific and medical (ISM) radio band, for example.

Referring to FIG. 1, the receiver architecture 100 advantageously comprises only one a local synthesizer, namely, the reference frequency synthesizer/phase locked loop (PLL) circuit 115, hereinafter also referred to in more general terms as the "reference frequency source". This reference frequency source is used for both the RF-to-IF and IF-to-base band conversion processes which, in turn, provides for lower power consumption. The illustrated synthesizer/PLL 115 is of the conventional type, to provide a programmable reference frequency output signal. Two features of the receiver architecture 100 contribute to enabling this novel use of only one reference frequency source.

One such feature of the receiver 100 is a configuration which uses injection locking to tune the local receiver oscillator (Rx LO) 105 which is used for the first mixing stage (i.e. the RF-to-IF conversion). Advantageously, the RF-to-IF mixing signal output from Rx LO 105 is a high-level harmonic of the relatively low frequency of the reference frequency source (synthesizer/PLL circuit) 115 which, in the illustrated example, is the $9^{th}$ harmonic. Also, in this example, it is seen that a fractional-N phase locked loop (PLL) is selected for use as the reference frequency source.

The other such feature of the receiver 100 is the use of a pre-tunable Q-enhanced IF filter 110 with sub-samplers/mixers 130, 140 for the second conversion stage (i.e. IF-to-baseband conversion). This enables use of sub-sampling with a harmonic of the reference frequency, driven by the same reference frequency source 115, which is the $2^{nd}$ harmonic in the illustrated example (it is to be recognized by the skilled reader that this reference to a harmonic is intended to mean a numerical multiple frequency thereof).

As a result, the two conversion stages are harmonically related and driven off the same frequency reference source 115 which, advantageously, can be configured as a relatively low frequency source due to the combined usage of injection locking in the receiver architecture. Moreover, by using a non-fixed IF (sometimes referred to as a "walking" IF) with tunable IF bandpass filtering, the aliasing obstacle normally presented by sub-sampling is resolved, and allows the use of sub-sampling for the second conversion in this architecture. The use of sub-sampling is also enabled by the use of the relatively low frequency source 115 as it then allow for use of a lower harmonic thereof for the sub-sampling. As will be immediately recognized by persons skilled in the art, this novel receiver architecture, which avoids the conventional usage of two synthesizer circuits for the two conversions and, in addition, performs the second down-conversion by sub-sampling, advantageously reduces power consumption.

Table 1 below provides a set of exemplary frequency values (in MHz) at various stages of the receiver architecture for each of 16 channels provided by the headphone product application, wherein a 5 MHz channel spacing is selected between RF frequencies and a crystal providing a frequency, $f_{xtal}$, of 22.57 MHz is used:

TABLE 1

| Channel | $f_{RF}$ | $f_s$ | $f_{PLL}$ | $f_{RxLO}$ | $f_{IF}$ |
|---|---|---|---|---|---|
| 1 | 2403 | 115.8072 | 231.6145 | 2084.53 | 318.4699 |
| 2 | 2408 | 116.0482 | 232.0964 | 2088.867 | 319.1325 |
| 3 | 2313 | 116.2892 | 232.5783 | 2093.205 | 319.7952 |
| 4 | 2418 | 116.5301 | 2330602 | 2097.542 | 320.4578 |
| 5 | 2423 | 116.7711 | 233.5422 | 2101.88 | 321.1205 |
| 6 | 2428 | 117.012 | 234.0241 | 2106.217 | 321.7831 |
| 7 | 2433 | 117.253 | 234.506 | 2110.554 | 322.4458 |
| 8 | 2438 | 117.494 | 234.988 | 2114.892 | 323.1084 |
| 9 | 2443 | 117.7349 | 235.4699 | 2119.229 | 323.7711 |
| 10 | 2448 | 117.9759 | 235.9518 | 2123.566 | 324.4337 |
| 11 | 2453 | 118.2169 | 236.4337 | 2127.904 | 325.0964 |
| 12 | 2458 | 118.4578 | 236.9157 | 2132.241 | 325.759 |
| 13 | 2463 | 118.6988 | 237.3976 | 2136.578 | 326.4217 |
| 14 | 2468 | 118.9398 | 237.8795 | 2140.916 | 327.0843 |

TABLE 1-continued

| Channel | $f_{RF}$ | $f_s$ | $f_{PLL}$ | $f_{RxLO}$ | $f_{IF}$ |
|---|---|---|---|---|---|
| 15 | 2473 | 119.1807 | 238.3614 | 2145.253 | 327.747 |
| 16 | 2478 | 119.4217 | 238.8434 | 2149.59 | 328.4096 |

From the foregoing Table 1 it will be seen that the frequencies of these signals are related according to the following:

$f_{RF} = (n \pm 1/4) \cdot f_s$, wherein $n$ is selected to be 21

$f_{PLL} = 2 \cdot f_s$ $f_{RxLO} = 9 \cdot f_{PLL}$ $f_{IF} = 2.75 \cdot f_s$

The optimal choice of n is dependent on the choice to be made for $f_s$ for any particular application. A higher value of n allows a choice of a lower value for $f_s$ and, as the reader will recognize, this is desirable to lower the power consumption since the PLL and sub-sampler can then run at lower frequencies. In addition, the choice of an appropriate value for n depends on the spacing between signal images that can be tolerated for a given circuit configuration, since the higher the value of n the closer will be the image signals. Phase noise may also present a factor to be considered in respect of a particular design and, thus, play a part in an optimal choice of the value of n. For example, $f_s$ may be chosen to be sufficiently high that the image signals are far enough away from the band pass IF signal that the IF filter attenuates them to such a degree as to render them ineffectual. In the exemplary embodiment illustrated herein the choice of $\pm 1/4$ in the relationship $f_{RF} = (n \pm 1/4) \cdot f_s$ is for the purpose of simplifying the down conversion process whereby discrete-time, complex signal components output from the sub-samplers 130 are, in effect, multiplied by a series of (1,0,-1,0) for the I component and by (0,1,0,-1) for the Q component, to produce the corresponding output baseband signal components 142

The received RF signal 10 is processed by an attenuator 40 for automated gain control (using a gain control signal 20 generated by the baseband digital processing circuitry 165 based on channel energy detection) and fed to a low noise amplifier (LNA) 120 loaded with a tank circuit RF filter 45 (i.e. off-chip). The overall Q of the RF filter 45 is nominally mid-range (e.g. 30 for the aforesaid ISM 2.4 GHz band) so as to provide some band selection. The resulting processed RF signal 122 is then down-converted by means of mixer 125 to convert the signal from the RF carrier to an IF (Intermediate Frequency) carrier. Advantageously, this is done by means of an injection locked local oscillator circuit (Rx LO) 105 which is configured for pre-tuning and driven from the aforesaid reference frequency source which is, here, a relatively low frequency fractional-N PLL 115 based on a crystal oscillator 160. This allows for a relatively high harmonic of the PLL 115 to lock the Rx LO 105.

The current output of mixer 125 is fed into the intermediate frequency (IF) Q-tuned filter 110 which also has off-chip inductors in the exemplary embodiment (it being understood that another design, and frequency plan, could instead be made to use on-chip inductors). For an intermediate frequency of approximately 320 MHz the IF filter 110 is Q-enhanced to a bandwidth of 5 MHz. Advantageously, this Q-enhancing allows the use of the sub-sampler 130 by providing the anti-aliasing which is necessary in order to use such sub-sampling. It also, provides some channel selection. Moreover, the use of this high Q filter before a large amount of the receiver gain occurs improves the dynamic range of receiver 100 and allows lower power consumption in subsequent stages.

The first-stage down converted signal 112 is fed to an IF amplifier (IFA) 135 comprised of source followers with gm boosting feedback which drives the second stage mixer comprising I and Q signal component sub-samplers 130 and sub-sampling mixers 140. The I, Q signals 132 output from the sub-samplers 130 have a bandpass frequency domain centered at $f_s/4$, where $f_s$ is the effective sampling frequency as shown in FIGS. 1 and 2. Sub-sampling mixers 140 modulate the signal 132 and convert it to a continuous time low-pass signal 142.

The following components of the receiver shown in FIGS. 1-4A will be well-known to and understood by persons skilled in the art and many variations and modifications may be devised for use in a specific application. For example, a programmable gain amplifier (PGA) 145 may be used to provide a requisite gain in the exemplary headphone transceiver application and an analog-to-digital converter (ADC) 150 may comprise a 2nd order continuous-time filter and 2-bit quantizer, but it will be recognized that because the signal here is low-pass and partially filtered, the requirements of linearity and bandwidth on PGA 145 and ADC 150 are relaxed. An analog control signal 20 for automatic gain control by the attenuator 40 is produced by automatic gain control (AGC) digital processing circuitry 155 using channel energy detection in receiver digital baseband circuitry 165. In addition, a state machine (not shown) may react to a saturation signal 153 from ADC 150, to cause the receiver gain to be reduced by PGA 145 in response to a control signal 22 produced by the AGC circuitry of the digital baseband circuitry 165 based on residual out-of-band interference detected at ADC 150 (but is digitally filtered and does not form part of the energy detection).

Figure 2A:
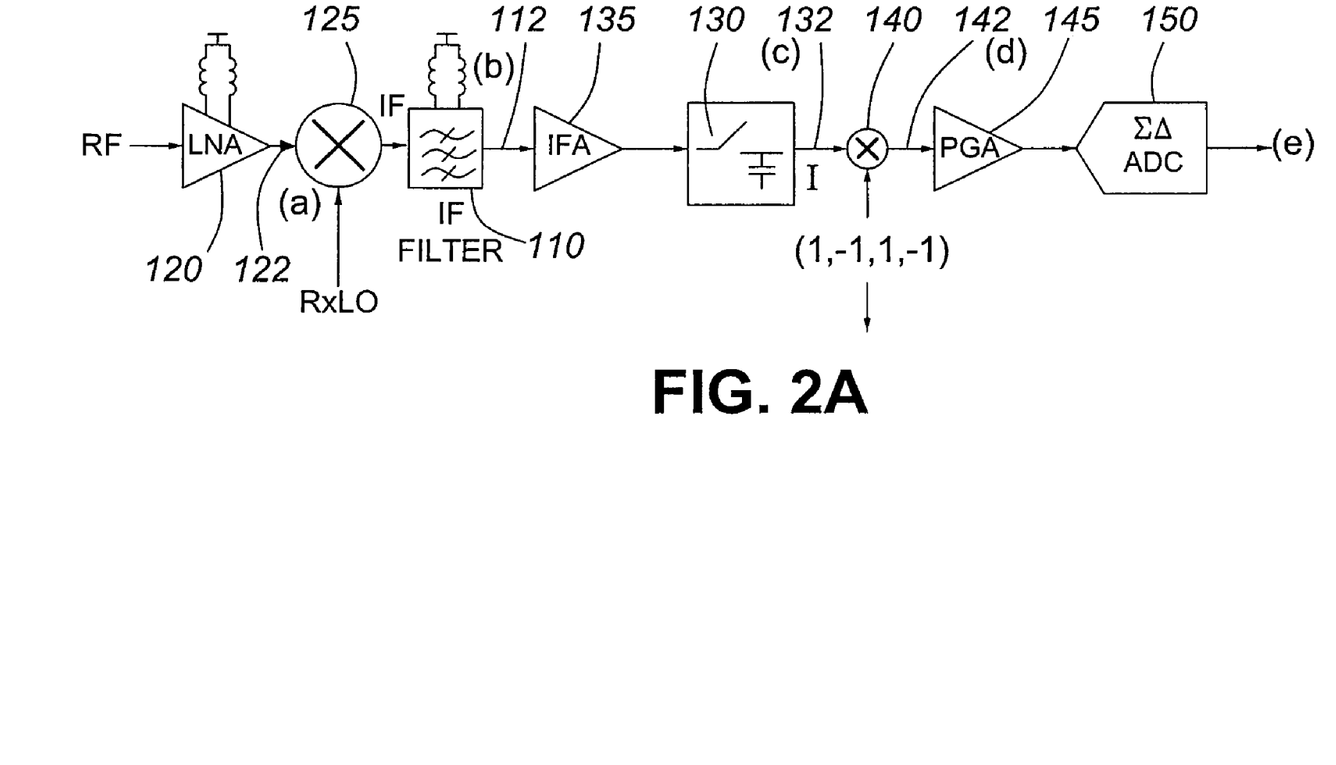
FIGS. 2A through 2F collectively depict the RF-to-IF and IF-to-base band frequency conversions of a receiver configured according to FIG. 1.
Figure 2B:
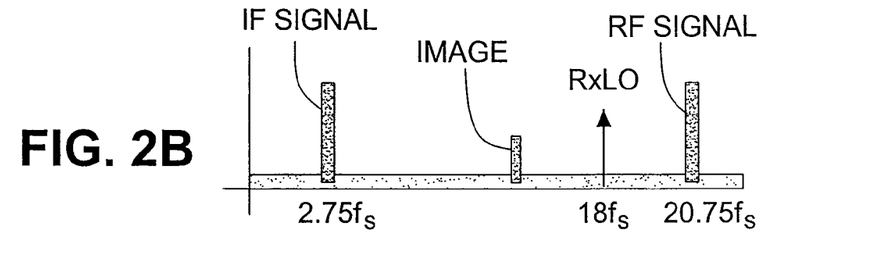
Figure 2C:
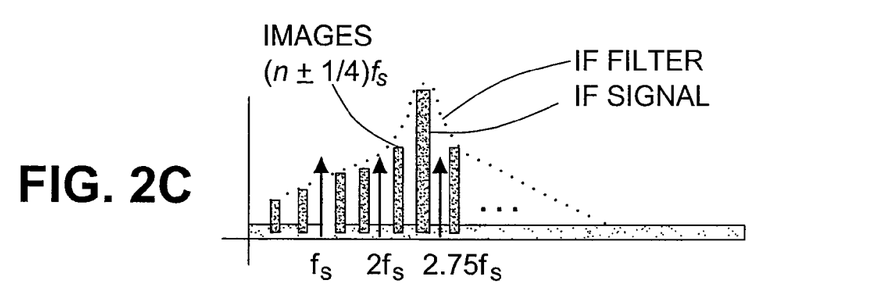
Figure 2D:
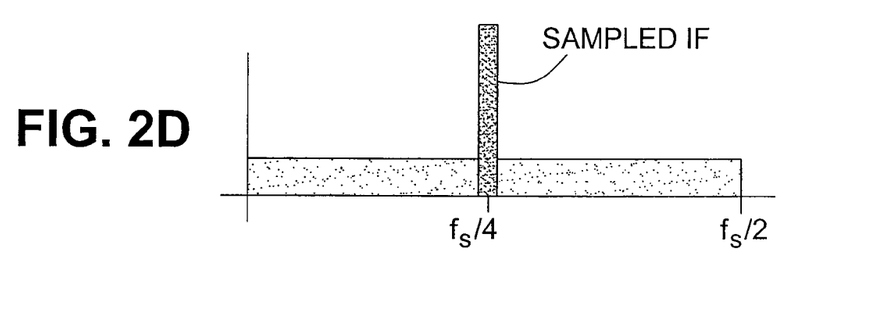
Figure 2E:
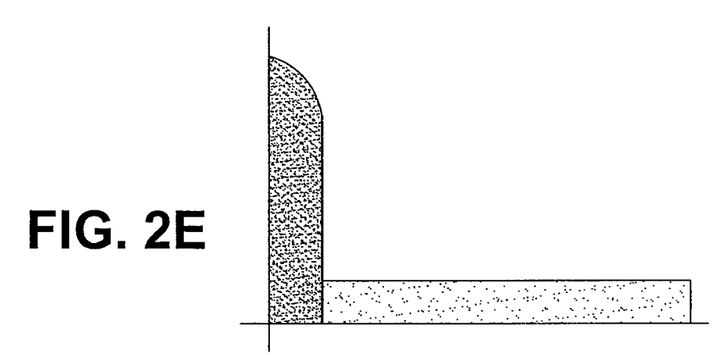
Figure 2F:
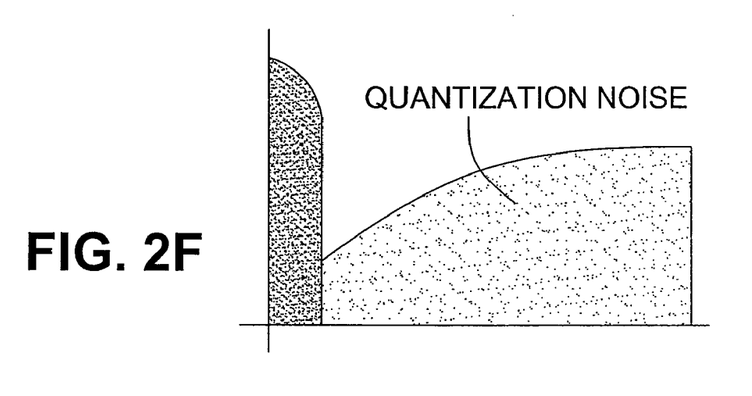

With reference to the signals shown at circuit locations identified in FIG. 2A, FIGS. 2B through 2F depict the frequency domain of the signal at each such point whereby these figures collectively illustrate the RF-to-IF and IF-to-base band frequency conversions of a receiver configured according to FIG. 1. FIG. 2A is largely the same as FIG. 1 but, for convenience, doesn't show the receiver local oscillator (Rx LO) circuitry 105 and some other components shown in FIG. 1 so that it shows only one-half of the I-Q processing circuitry starting with the sub-sampling circuitry. FIG. 2B graphically depicts the frequency domain of the received RF signal at location (a) of FIG. 2A and also shows the RF-to-IF mixing signal Rx LO which is output from the local oscillator circuit Rx LO 115. FIG. 2C graphically depicts the frequency domain of the down-converted IF signal at location (b) of FIG. 2A. FIGS. 2D and 2E graphically depict the I and Q signal components for the IF-to-base band frequency down conversion, the former depicting the frequency domain of the sub-sampled signal at location (c) (and, as will be recognized by persons skilled in the art, in actuality the I and Q signal components will each be at $f_s/2$ rather than the $f_s/4$ used here for ease of illustration) and the latter depicting the frequency domain of the mixer-converted signal at location (d) of FIG. 2A. FIG. 2F depicts the down-converted signal at location (d) after processing by the analog-to-digital converter (ADC).

With reference to FIG. 1 it will be noted by the reader skilled in the art that a transmitter 200 can readily make use of a complementary architecture to that of receiver 100. As is done in receiver 100, a transmit local oscillator (Tx LO) 205 with off-chip inductors can, similarly, be injection lock driven from a harmonic of the reference frequency source (PLL) 115. For example, for the transmit mode, PLL 115 may be adjusted to a slightly different frequency (e.g. ~220 MHz) so that direct up-conversion is possible using, for example, the $11^{th}$ harmonic of PLL 115. The clock rate of the transmitter baseband is the frequency of crystal oscillator 160 and the PLL 115 is able to achieve a very low current draw while meeting a switching time constraint of 60 µs between the transmit (Tx) and receive (Rx) frequencies. Then, the other circuit components 220 of transmitter 200 may be arranged in a standard configuration, well known to those in the art.

As highlighted above, the single reference synthesizer architecture of the receiver 100 avoids the necessity for a second radio frequency (RF) PLL by making use of injection locking the RX LO 105 which is the subject of U.S. Pat. No. 6,963,249 issued on 8 Nov. 2005 and assigned to the same assignee as this application. In turn, this injection locking is achieved in this embodiment by digitally pre-tuning the Rx LO 105 to an injection locking frequency which is sufficiently within a locking bandwidth of the Rx LO, to enable injection locking to occur when the PLL 155 reference signal is input to the Rx LO. The pre-tuning brings the free-running frequency of the oscillator close enough to the desired frequency so that injection locking can be guaranteed. Without this pre-tuning, it would not be possible to injection lock Rx LO 105 (or Tx LO 205) given the process variation of the oscillator's tank circuit.

Figure 3:
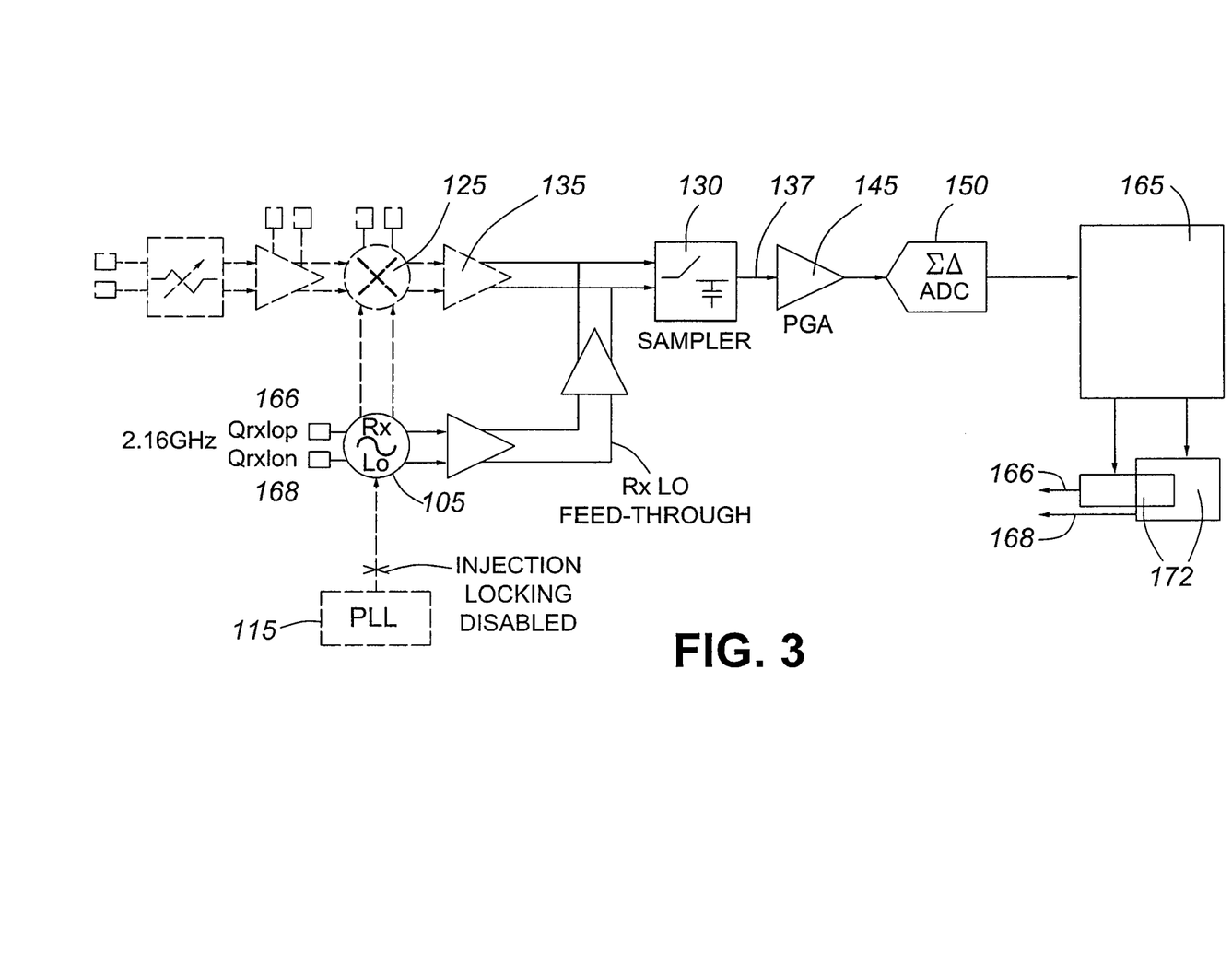
FIG. 3 is a block diagram illustration of the circuitry which operates to pre-tune the Rx LO prior to injection locking with the fractional-N phase locked loop PLL)

As illustrated by FIG. 3, the digital processing capability of the digital baseband circuitry 165 is used to determine the center frequency ($f_c$) of the output of the Rx LO 105 (and possibly also Tx LO 205 in the complementary transmit circuit architecture, but without a repetitive description thereof being provided hereinafter). The tuning of the Rx LO 105 is accomplished in the digital domain. To begin, the reference frequency signal provided by PLL 115, which is normally input to the Rx LO 105, is disabled and instead a secondary path is enabled, as described in the following. The pre-tuning is performed by transmitting the output of Rx LO 105, via this secondary path as illustrated, directly to the sub-sampler 130 and the receiver 100 determines the center frequency of the output of the Rx LO 105 during this secondary path-mode. The sub-sampled signal 137 is processed for gain and converted to digital form (via gain and DAC components 145, 150). The resultant digital signal is processed in the digital domain, using a digital microcontroller in the receiver baseband circuitry 165, to determine the center frequency ($f_c$) of the Rx LO 105.

As persons skilled in the art will understand, a number of different methods are available for the required determination of $f_c$. In the exemplary embodiment, this is accomplished through the use of an "energy detect" component (not specifically shown in the drawings) within the receiver digital baseband circuitry 165 which generates a signal proportional to the energy in the signal band. In this discussion, with reference to FIG. 3, it is the frequency of the RX LO 105 output to be determined (tested). Because the digital baseband is of finite bandwidth, if the center frequency of the RX LO 105 output being tested is in the channel, this becomes obvious from the output signal generated by the energy detect component.

According to this procedure, the frequency of the PLL 115 is set so that the sampling frequency used during this secondary path-mode performs a frequency conversion that would match with a conversion from the desired frequency of the Rx LO 105, the desired frequency being the targeted injection locking frequency at which the Rx LO is sufficient pre-tuned for injection locking and RF-to-IF down-conversion for the pre-selected RF channel. Then a sweep of the frequency of the RX LO 105, from maximum down, is performed and at each step, the energy detect component output signal is considered. The sweep is stopped when the output of the energy detect component goes above a certain limit and, at this point, it is known that the frequency of the RX LO 105 is either at the injection locking frequency or, instead, at an alias frequency. Due to the latter possibility it is then necessary to determine which is correct, before the tuning is complete. So, the PLL 115 is then set to a second sampling frequency, such that the desired frequency of the RX LO 105 will still fall in-band, but the undesired alias frequencies will not fall in-band. From this information it is determined (i.e. as the logical result of this) whether or not there has been a verification that the desired frequency has been reached; if so, the Rx LO has been pre-tuned to the injection locking frequency for that RF channel. If the desired frequency isn't found by this step, the sweep is continued from where it left off to find the next peak, and this algorithm is repeated until the desired match condition is met.

For purposes of instruction only, the reader is asked to consider a scenario for which it is desired to tune the RX LO 105 to receive an RF signal of frequency $f_{RF}$ equal to 2408 MHz. To implement the process for tuning the RX LO 105 to this desired (target) channel, the microcontroller first sets the sampling frequency to 116 MHz. The RX LO 105 is set to a predetermined maximum frequency and a sweep of its frequency is instituted until the applicable threshold energy is detected by the energy detect component. At this point it is not known whether the desired frequency is actually being output by the RX LO 105. Let's consider for explanatory purposes that, at this point, it is actually outputting a frequency for tuning into a channel having an $f_{RF}$ value of (2408+116/2) MHz=2466 MHz, that is, the first alias band above the desired frequency channel. Therefore, at this point, it is impossible to tell whether the desired frequency is being output by the Rx LO 105. Then, the sampling frequency ($f_S$) is set so that instead of a factor of 20.75 (i.e. in the relationship $f_{RF}=(n\pm\frac{1}{4})\cdot f_s$, wherein n is selected to be 21, such that the factor $n\pm\frac{1}{4}$ is 20.75 or 21.25), the other factor of 21.25 is used. This means that the sampling frequency is set to 113.3 MHz. This frequency will also find 2408 MHz; however, it will not find 2466 MHz (since 2408+113.3/2=2464). Thus, if the sampling frequency were to be changed accordingly there would no longer be any such detection of a peak in the energy at baseband. So, returning to the process with use of the original sampling frequency, the frequency sweep is performed and eventually another peak in energy is detected but this time when the second sampling frequency is applied a peak energy is still detected at baseband, meaning that the Rx LO 105 output is now at the desired frequency to tune to this channel.

Once the Rx LO 105 frequency is determined it is adjusted by fedback control signals 166 and 168 which are generated, as aforesaid, by the digital baseband circuitry 165 and converted to analog form by digital-to-analog converters 172. This pre-tuning feedback process is continuously repeated until the desired Rx LO 105 frequency is reached.

When the Rx LO 105 has been pre-tuned close enough to the desired oscillation frequency (i.e. to within the LBW) to allow injection locking, the PLL 115 is once again enabled and the pre-tuning secondary path is disabled.

By pre-tuning Rx LO 105 so that its oscillation frequency $f_c$ is close to the desired frequency, the required locking bandwidth (LBW) for injection locking to be achieved is reduced significantly. A reduction in the LBW reduces the required power of the injection locking reference frequency source 115 signal and, in turn, this allows use of higher harmonics of a relatively low reference frequency to be used for down-conversion. As shown in FIG. 1, a low frequency crystal oscillator 160 with PLL 115 are used to injection lock the RF Rx LO 105 with the $x^{th}$ harmonic, in this example x being selected to be 9.

Figure 5:
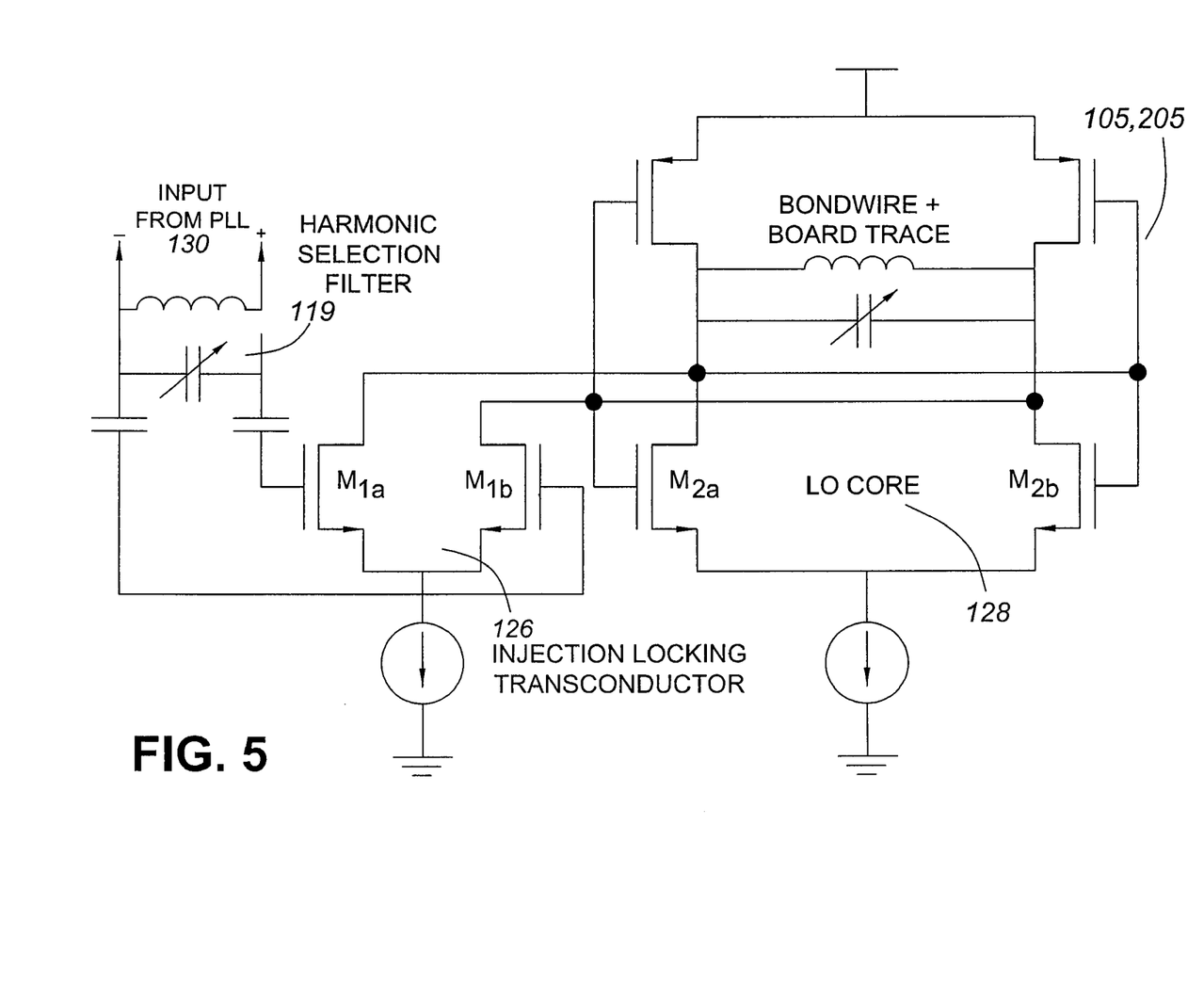
FIG. 5 is a more detailed block diagram illustration of the Rx LO showing the injection locking circuitry; and, FIG. 6 is a more detailed block diagram illustration of the receiver sub-sampling circuitry.

FIG. 5 is a more detailed block diagram illustration of the Rx LO 105 showing the injection locking circuitry. A square wave is output from PLL 115 (thus, having large harmonic content) and applied to a band pass filter (BPF) 119 to select the desired, odd harmonic wherein an odd harmonic is used in the headphone receiver application because a differential input is applied to the Rx LO 105 (the $9^{th}$ harmonic being used in that application). Once that selected harmonic signal is applied to the Rx LO 105, the Rx LO 105 becomes and remains locked to that harmonic signal. As shown, in the RX LO 105 circuitry the harmonic signal is then converted to a current by the injection locking transconductor 126 and fed directly into the core 128 of RX LO 105.

The injection locking bandwidth is typically related to the input injection locking power with the latter increasing (in dBm) as the former increases. The phase noise of the resulting locked LO is a factor of $n^2$ or 20 log(n) higher than the phase noise of the source signal (i.e. PLL 115), where n is the injection locking harmonic used. Persons skilled in the art will be familiar with the known measures available to counter this effect, where desired. These include inter alia the possibility of using an off-chip tank circuit with a high Q inductor for PLL's 115 core voltage controlled oscillator (VCO) or, to reduce the effect of phase noise on the error vector magnitude (EVM) in the receiver (and transmitter), the possibility of using a differential detection scheme (it being well known in the art that differential detection has the effect of rejecting close in-phase noise from the incoming signal).

Figure 4A:
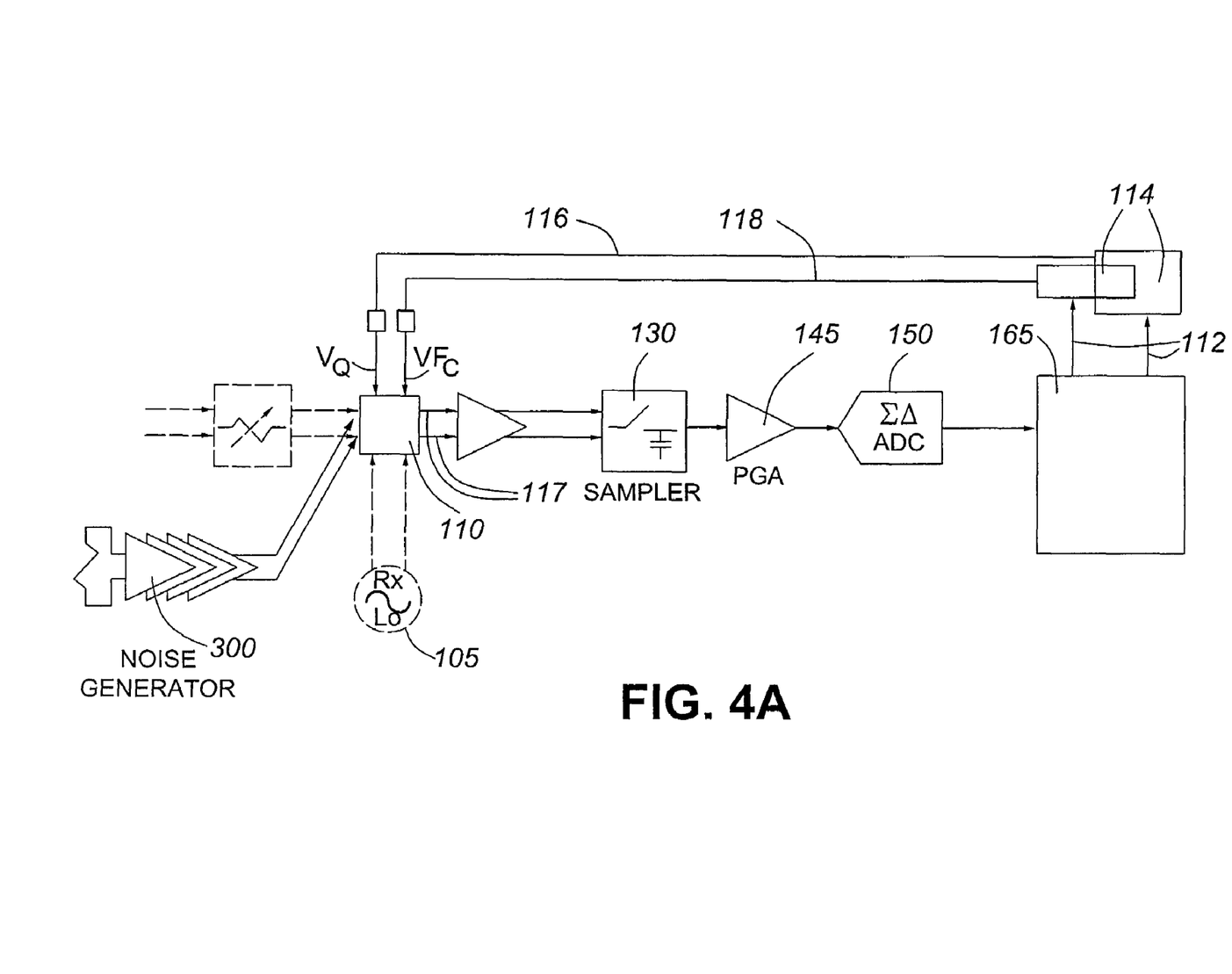
FIG. 4A is a block diagram illustration of the IF filter Q-tuning circuitry for narrow bandpass filtering and FIG. 4B is an exemplary circuit for a Q-tunable IF filter.
Figure 4B:
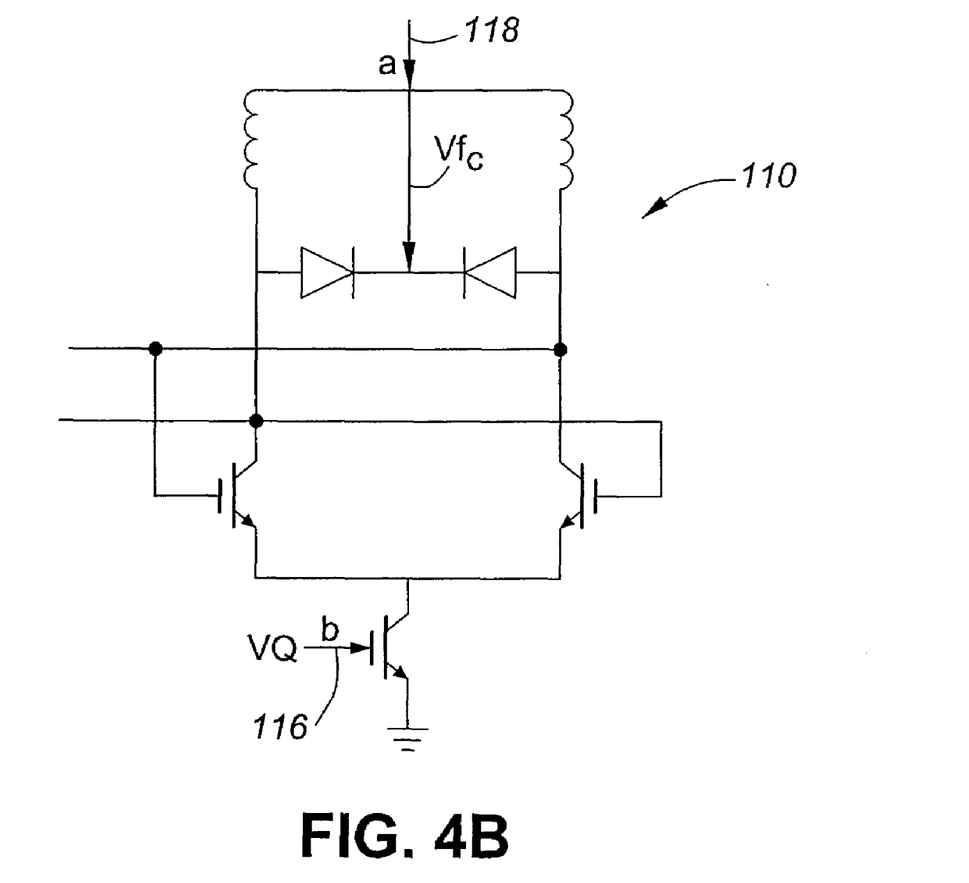

The filter Q-tuning circuitry which is advantageously used for narrow bandpass filtering by the IF filter 110 is shown by FIG. 4A. FIG. 4B provides an exemplary circuit for the Q-tunable IF filter component. As is well known, the band-pass frequency response of filter 110 is characterized by its filter parameter Q and its center frequency $f_c$ and, for additional discussion of directly tuning a filter the reader may refer to U.S. Pat. No. 6,983,136 issued on 3 Jan. 2006 and assigned to the same assignee as this application.

In the exemplary example described herein, the filter 110 is pre-tuned according the following process. As a first step the filter 110 is placed in oscillation by increasing its Q parameter past the point of oscillation. Then the frequency $f_c$ of the filter 110 is determined in similar manner to that described above for determining the frequency of RxLO 105, until the frequency is within about 2 MHz (i.e. within about 1%) of the desired center frequency.

Then, once the frequency $f_c$ of the filter 110 is within that target of the desired frequency, the circuit path from the local oscillator Rx LO 105 is disabled and, instead, a secondary path from a noise generator 300 is enabled. This noise generation path provides to filter 110 a white noise signal having a substantially flat power spectral density. The noise signal is then filtered by IF filter 110 to produce at the filter output 117 a signal having a power spectral density which is proportionally representative of the frequency response of the IF filter 110. The filter output 117 is fed directly to the sub-sampler 130 and the sub-sampled signal is then processed for gain and converted to digital form (via gain and ADC components 145, 150). The resultant digital signal is processed in the digital domain, using a digital microcontroller in the receiver baseband circuitry 165, to determine the filter parameters Q and $f_c$.

The digital processing circuitry 165 produces digital control signals 112 for adjustment of the Q and $f_c$ of the filter 110. These are converted to analog control signals 116, 118 using digital-to-analog converters (DACs) 114. As shown by FIG.

4B, the filter 110 is equipped to have analog filter adjustment inputs a and b that directly adjust a respective filter element for each characterizing parameter.

In the exemplary example described herein the filter 110 parameters $f_c$ and Q are determined as follows. A digital filter (not shown) having a narrow bandwidth is used to more finely resolve the frequency response of the IF filter 110. This is done by setting the PLL 115 such that the desired center frequency of the IF filter 110 is converted and then the power is calculated by the digital filter, thereby providing the power at that center frequency. Then the PLL 115 frequency is changed (the required change in $f_{PLL}$ being derived per the foregoing frequency equations) such that $f_c$+5 MHz is captured by filter 110 and the power is calculated. Then a third such reading is performing using $f_c$−5 MHz so that three different power points are known (i.e $f_c$+5 MHz, $f_c$, and $f_c$−5 MHz). Then the PLL 115 frequency is adjusted, and the foregoing three point measurement steps repeated, until the calculated powers at the edges i.e. at each of $f_c$−5 MHz and $f_c$+5 MHz, become equal since this indicates that the filter 110 is centered between those two points. After this, the value of the parameter Q for filter 110 is calculated using the ratio of the powers at $f_c$ and one of $f_c$−5 MHz and $f_c$+5 MHz (as is well-known, there is a 1-to-1 correspondence between Q and this ratio).

It will be recognized by the skilled reader that there are different methods for determining the filter 110 parameters $f_c$ and Q which might be adaptable to a particular application depending on required speed, accuracy and power requirements. Examples of other such methods include those described in the assignee's aforementioned U.S. Pat. No. 6,983,136; and, performing an FFT of the sampled data (i.e. removing the narrow band desired signal and any other interfering signals, smoothing the amplified noise if necessary and finding the peak of the resultant frequency response). Other alternatives are also known in the art and, depending on any particular speed, accuracy and/or power requirements, one such other method may be chosen as appropriate for a given application.

Figure 6:
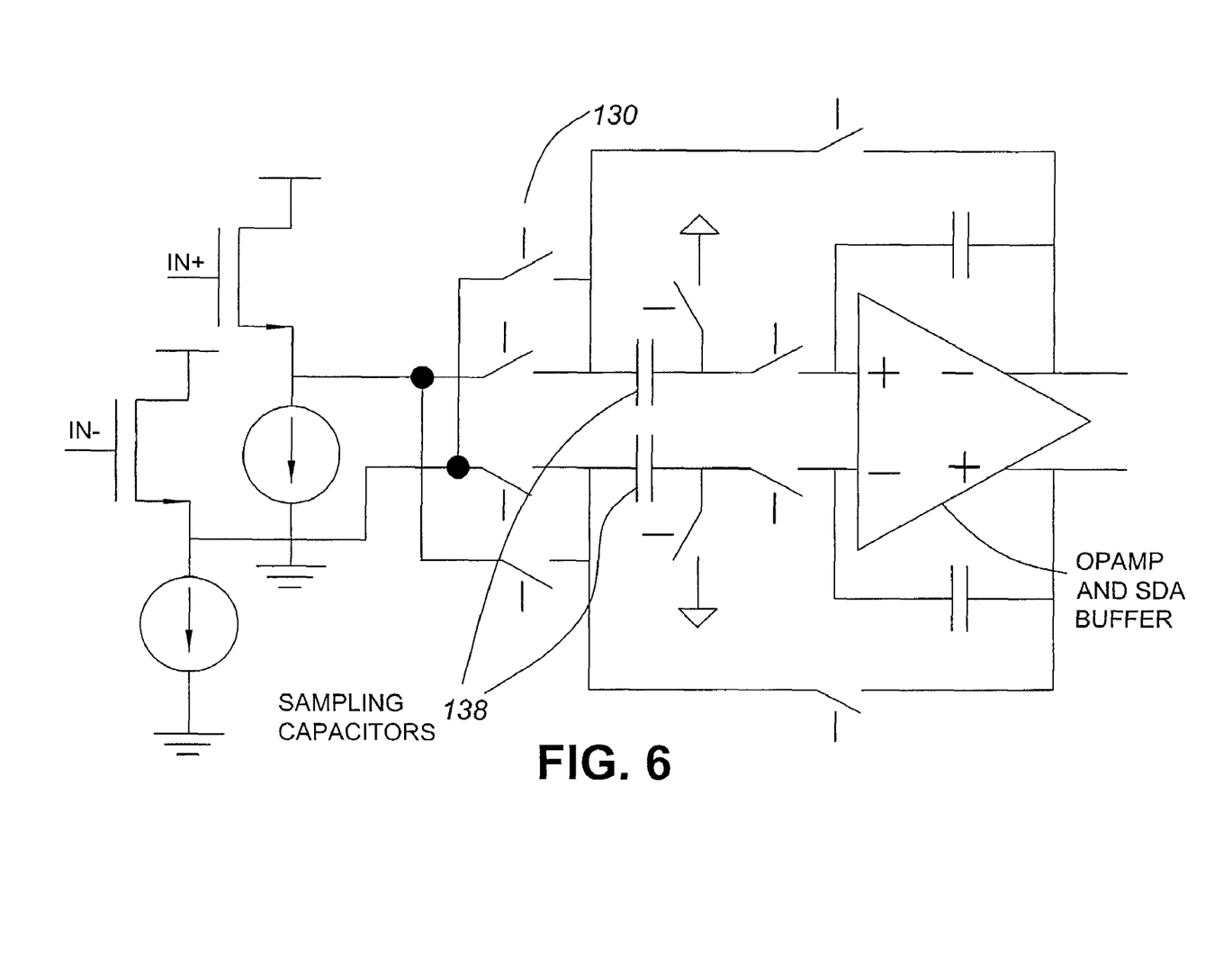

Referring to FIG. 6, a more detailed block diagram illustration of the receiver sub-sampling circuitry 130 is provided. The IF signal is offset from a harmonic of the sampling frequency $f_s$ by a factor of $f_s/4$ causing images to appear at offsets of $f_s/2$. Baseband conversion is then easily facilitated with alternate inversion of the signal by mixer 140. As will be readily understood by persons skilled in the art, the notation (1,−1) to each mixer 140 in FIGS. 1 and 2 signifies the conversion to DC. Wideband noise from the IFA 135 and sub-sampling mixer 140 are also then mixed down, increasing the noise density. IFA 135 is a source follower, designed with low enough output impedance to drive the sampling capacitors. The noise generated by IFA 135 and sub-sampler 130 is essentially set by the size of the sampling capacitors 138. Larger capacitors will decrease the kT/C noise and a larger gm in IFA 135 will decrease the wideband noise from IFA 135. To maintain the sampler bandwidth, the switches are sized properly, putting an effective limit on how large the capacitors can be made.

The closest image due to the sub-sampling is at an $f_s/2$ offset, or approximately 60 MHz offset for the particular example described herein. For the first and last few channels, this image lands in-band and has the most effect, while the center channels are not significantly affected.

With the foregoing exemplary embodiment of the invention having been disclosed, it will be apparent to those skilled in the art that various changes and modifications can be made which will achieve the advantages of the invention all of which are intended to fall within the scope of the invention as defined by the claims that follow.

What is claimed is:

1. Radio frequency (RF) receiver circuitry configured for receiving an RF signal and down-converting said RF signal to base band, said receiver circuitry comprising:
   (a) RF-to-IF conversion circuitry configured for RF-to-IF conversion of said RF signal to an IF signal, said RF-to-IF conversion circuitry comprising mixer circuitry for down-converting said RF signal to a band pass IF signal; local oscillator circuitry configured for injection locking and generating an RF-to-IF mixing signal for input to said mixer circuitry, said mixing signal having a frequency which is a first pre-selected harmonic of a reference frequency; and, tunable IF filter circuitry comprising an IF filter and configured for pre-tuning said IF filter to said band of said band pass IF signal and, when so tuned, for filtering said band pass IF signal;
   (b) IF-to-base band conversion circuitry configured for IF-to-base band conversion of said IF signal, said IF-to-base band conversion circuitry comprising sub-sampling and down-conversion circuitry operating at a sampling frequency of a sampling signal input thereto, said sampling frequency being a second pre-selected harmonic of said reference frequency; and,
   (c) reference frequency source circuitry configured for generating a reference signal of said reference frequency;
      wherein each of said mixing signal and said sampling signal is derived from said reference signal as a harmonic thereof.

2. Receiver circuitry according to claim 1 wherein said sub-sampling and down-conversion circuitry comprises I and Q complex signal component sub-samplers.

3. Receiver circuitry according to claim 2, comprising analog to digital circuitry and digital baseband circuitry comprising a microcontroller.

4. Receiver circuitry according to claim 3 comprising selectably operable injection locking pre-tuning circuitry configured for pre-tuning said local oscillator circuitry to an injection locking frequency sufficiently within a locking bandwidth of said local oscillator circuitry to enable injection locking by said first pre-selected harmonic of said reference signal.

5. Receiver circuitry according to claim 4, wherein said injection locking pre-tuning circuitry operates said sub-sampling down-conversion circuitry at selectable sampling frequencies determined by said digital baseband circuitry for down-converting said RF signal; and, said digital baseband circuitry comprises an energy detect component configured for determining a measure of energy of said down-converted RF signal; wherein said selectable sampling frequencies are selected for producing those alias bands from which said injection locking frequency is distinguished on the basis of said measure of energy determined by said energy detect component.

6. Receiver circuitry according to claim 1 wherein said tunable IF filter circuitry is configured for tuning a center frequency parameter of said tunable IF filter circuitry.

7. Receiver circuitry according to claim 1 wherein said tunable IF filter circuitry is configured for tuning both a center frequency parameter, and a Q parameter, of said tunable IF filter circuitry.

8. Receiver circuitry according to claim 1 wherein said tunable IF filter circuitry comprises a noise generator configured for generating, and selectably inputting to said tunable IF filter circuitry, a white noise signal for use in tuning said tunable IF filter circuitry.

9. Receiver circuitry according to claim 1 wherein said reference frequency source circuitry is a synthesizer, said reference frequency being selectable by said microcontroller.

10. Receiver circuitry according to claim 1 wherein said first pre-selected harmonic is 9 and said second pre-selected harmonic is 2.

11. A method for receiving an RF signal and down-converting said RF signal to base band, said method comprising:
   (a) down-converting said RF signal to a band pass IF signal whereby injection locking local oscillator circuitry generates a mixing signal for use in said RF-to-IF down-converting, said mixing signal having a frequency which is a first pre-selected harmonic of a reference frequency; and, tunable IF filter circuitry is pre-tuned to said band of said band pass IF signal and, when so tuned, filters said band pass IF signal; and,
   (b) down-converting said IF signal to a base band signal whereby said IF signal is sub-sampled by I and Q complex signal component sub-samplers at a sampling frequency which is a second pre-selected harmonic of said reference frequency.

12. A method according to claim 11, further comprising converting said base band signal from analog form to digital form.

13. A method according to claim 12 comprising pre-tuning said local oscillator circuitry to an injection locking frequency sufficiently within a locking bandwidth of said local oscillator circuitry to enable injection locking by said first pre-selected harmonic of said reference frequency.

14. A method according to claim 13, whereby said pre-tuning said local oscillator circuitry comprises, repetitively: (i) performing said sub-sampling at selected sampling frequencies selected to produce those alias bands from which said injection locking frequency can be distinguished on the basis of a measure of energy of said down-converted RF signal; and, (ii) determining said measure of energy of said down-converted RF signal; until said injection locking frequency is distinguished by said determined measure of energy.

15. A method according to claim 11 whereby said pre-tuning tunable IF filter circuitry includes tuning a center frequency parameter of said tunable IF filter circuitry.

16. A method according to claim 11 whereby said pre-tuning tunable IF filter circuitry includes tuning both a center frequency parameter, and a Q parameter, of said tunable IF filter circuitry.

17. A method according to claim 11 whereby said pre-tuning tunable IF filter circuitry includes generating, and selectably inputting to said tunable IF filter circuitry, white noise.

18. A method according to claim 11 whereby said reference frequency is selected by a microcontroller and provided by a synthesizer.

19. A method according to claim 11 wherein said first pre-selected harmonic is 9 and said second pre-selected harmonic is 2.

* * * * *

UNITED STATES PATENT AND TRADEMARK OFFICE
CERTIFICATE OF CORRECTION

PATENT NO. : 7,539,476 B2  Page 1 of 3
APPLICATION NO. : 11/374571
DATED : May 26, 2009
INVENTOR(S) : Devries et al.

It is certified that error appears in the above-identified patent and that said Letters Patent is hereby corrected as shown below:

Delete title page and substitute therefore the attached title page consisting of corrected Fig. 1

Delete Drawing Sheet 1 of 9 and substitute therefore the attached Drawing Sheet 1 of 9

Column 1
Line 62, change "PLL);" to --PLL;--

Column 2
Line 65, delete "a" after "one"

Column 3
Line 38, change "allow" to --allows--

Column 4
Line 33, add --,-- after "herein"
Line 66, change "It also," to --It also--

Column 6
Line 64, change "sufficient" to --sufficiently--

Column 7
Line 6, add --,-- after "possibility"
Line 7, delete "," after "correct"
Line 13, add --105-- after "Rx LO"

Column 8
Line 32, add --,-- after "circuitry"
Line 33, add --,-- after "110"
Line 37, change "f_c and, for" to --$f_c$. For--

Column 9
Line 4, add --,-- after "herein"

Signed and Sealed this

Nineteenth Day of January, 2010

David J. Kappos
*Director of the United States Patent and Trademark Office*

(12) United States Patent
Devries et al.

(10) Patent No.: US 7,539,476 B2
(45) Date of Patent: May 26, 2009

(54) RF-TO-BASEBAND RECEIVER ARCHITECTURE

(75) Inventors: Christopher Andrew Devries, Ottawa (CA); Ralph Dickson Mason, Ottawa (CA); Ronald Douglas Beards, Mountain (CA)

(73) Assignee: Kleer Semiconductor Corporation, Ottawa (CA)

( * ) Notice: Subject to any disclaimer, the term of this patent is extended or adjusted under 35 U.S.C. 154(b) by 463 days.

(21) Appl. No.: 11/374,571

(22) Filed: Mar. 13, 2006

(65) Prior Publication Data
US 2007/0213019 A1 Sep. 13, 2007

(51) Int. Cl.
*H04B 15/00* (2006.01)
*H04Q 7/20* (2006.01)

(52) U.S. Cl. ............... 455/313; 455/265; 331/55; 331/172

(58) Field of Classification Search ............ 455/76, 455/207–209, 259–260, 264–265, 313–314, 455/323; 331/47, 55, 172
See application file for complete search history.

(56) References Cited

U.S. PATENT DOCUMENTS

| | | |
|---|---|---|
| 4,776,040 A | 10/1988 | Ichikawa et al. |
| 5,640,698 A | 6/1997 | Shen et al. |
| 6,963,249 B2 | 11/2005 | Devries et al. |
| 6,983,136 B2 | 1/2006 | Mason et al. |
| 2002/0181614 A1 | 12/2002 | Mostafa et al. |
| 2004/0005869 A1 | 1/2004 | See et al. |

OTHER PUBLICATIONS

Chris DeVries et al., *A 0.18 µm CMOS, High Q-enhanced Bandpass Filter with Direct Digital Tuning.* Proceedings of the IEEE 2002 Custom Integrated Circuits Conference, May 12-15, 2002, pp. 279-282.

Hesham Ahmed et al., *A Digitally Tuned 1.1 GHz Subharmonic Injection-Locked VCO in 0.18 µm CMOS.* Proceedings of the 29th European Solid-State Circuits Conference, Sep. 16-18, 2003, pp. 81-84.

(Continued)

*Primary Examiner*—Lee Nguyen
(74) *Attorney, Agent, or Firm*—Workman Nydegger (57) ABSTRACT

An improved receiver architecture and method for a wireless transceiver (e.g. for a headphone) is provided whereby the receiver, advantageously, enables the use of only one synthesizer circuit for both the RF-to-IF and IF-to-base band conversion processes which, in turn, provides for lower power consumption. The receiver includes an injection locked local receiver oscillator (Rx LO) which is used for the first mixing stage (i.e. the RF-to-IF conversion). The Rx LO 105 is thereby able to use a high-level harmonic of a relatively low reference frequency signal produced by that synthesizer (e.g. a fractional-N phase locked loop circuit (PLL)). The receiver further includes a tunable Q-enhanced IF filter 110 and complex sub-sampling and mixing down-conversion circuitry for the second conversion stage (i.e. IF-to-baseband conversion). The sampling frequency used for the second conversion stage is a harmonic of the reference frequency derived from the synthesizer (PLL). For example, transceiver channels may be designed on the basis that the RF frequency $f_{RF}$ is assigned a value of $(n \pm \frac{1}{4}) \cdot f_s$, where the frequency $f_{PLL}$ of the PLL may be chosen to be twice the sub-sampling frequency $f_s$ and the frequency $f_{Rx\_LO}$ of the Rx LO may be nine times the frequency $f_{PLL}$.

19 Claims, 9 Drawing Sheets

FIG. 1